(12) United States Patent
Gupta et al.

(10) Patent No.: US 10,055,245 B1
(45) Date of Patent: Aug. 21, 2018

(54) IMMUTABLE CONFIGURATION OF VIRTUAL COMPUTER SYSTEMS

(71) Applicant: Amazon Technologies, Inc., Seattle, WA (US)

(72) Inventors: Diwakar Gupta, Seattle, WA (US); Joseph E. Magerramov, Bellevue, WA (US); Richard Hazen Galliher, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/197,514

(22) Filed: Jun. 29, 2016

(51) Int. Cl.
 *G06F 9/455* (2018.01)
 *G06F 9/445* (2018.01)

(52) U.S. Cl.
 CPC ...... *G06F 9/45558* (2013.01); *G06F 9/44505* (2013.01); *G06F 2009/45562* (2013.01)

(58) Field of Classification Search
 None
 See application file for complete search history.

(56) References Cited

U.S. PATENT DOCUMENTS

| | | | | |
|---|---|---|---|---|
| 2002/0026531 A1* | 2/2002 | Keane | ................. | H04L 12/4641 709/250 |
| 2002/0069274 A1* | 6/2002 | Tindal | ................. | H04L 41/0893 709/223 |
| 2002/0112095 A1* | 8/2002 | Ford | ................... | H04L 41/0253 719/330 |
| 2008/0043756 A1* | 2/2008 | Droux | ..................... | H04L 12/66 370/399 |
| 2011/0134793 A1* | 6/2011 | Elsen | .................... | H04L 12/462 370/254 |
| 2011/0209203 A1* | 8/2011 | Shafer | ................... | G06F 21/604 726/4 |
| 2014/0201516 A1* | 7/2014 | Bjarnason | ............... | H04L 45/64 713/150 |
| 2016/0043919 A1* | 2/2016 | Connelly | ................ | H04L 41/28 709/220 |
| 2016/0212012 A1* | 7/2016 | Young | .................... | H04L 41/14 |

* cited by examiner

*Primary Examiner* — Dong Kim
(74) *Attorney, Agent, or Firm* — Davis Wright Tremaine LLP

(57) ABSTRACT

Components associated with the management, instantiation, and control of instances, such as virtual machine instances, are configurable for immutability. In some embodiments, immutability is requested for one or more functionalities affecting or otherwise associated with an instance. Information regarding the request, as well as the requested immutability, may be propagated to one or more components, such as management components, for enforcement. Instances configured to have some or part of their functionality designated as immutable may be used to implement some or all of the management components themselves, and thus be used as a part (or entirety) of a management subsystem for other instantiations.

20 Claims, 10 Drawing Sheets

IMMUTABLE CONFIGURATION OF VIRTUAL COMPUTER SYSTEMS

BACKGROUND

The use of network computing and storage has proliferated in recent years, and continues to proliferate. The resources for network computing and storage are often provided by computing resource providers who leverage large-scale networks of computers, servers and storage drives to enable clients, including content providers, customers and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. Some of these situations may at least partly be caused by insufficient scalability of components used to manage, instantiate, or otherwise control the functionality of the virtual resources.

A related consideration is that with the growing use of virtual resources, the configuration (whether by customer or otherwise) of such resources, and the interconfiguration and topology of multiple resources, is becoming increasingly complex. Accordingly, it is becoming easier, and potentially more damaging, to inadvertently or intentionally make destructive changes to such configurations.

BRIEF DESCRIPTION OF THE DRAWINGS

Various techniques will be described with reference to the drawings, in which.

DETAILED DESCRIPTION

Figure 1:
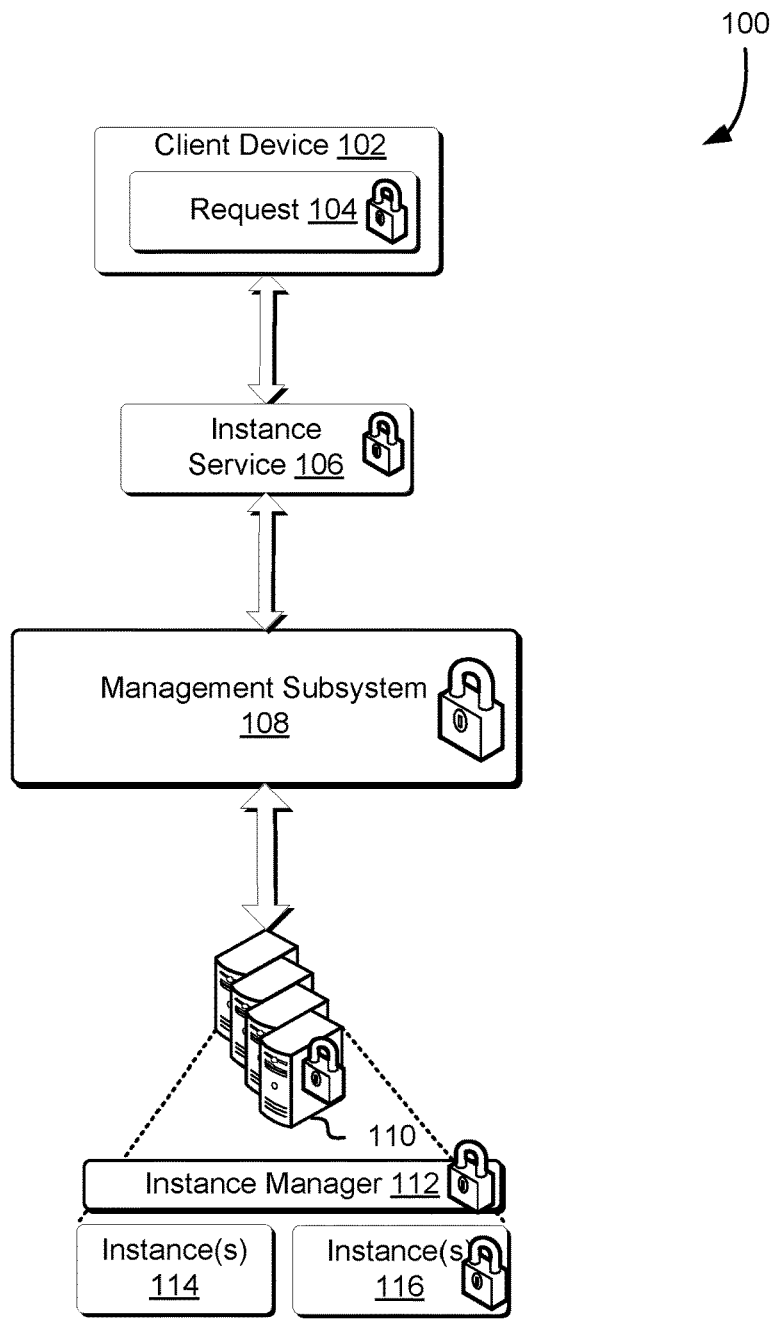
FIG. 1 illustrates a representational flow of a immutability request associated with one or more instances through components of a virtual computer system service, in accordance with some embodiments.

In one example, one or more virtual machine instances include functional blocks that are configurable to be immutable (i.e., unchangeable from a designated configuration or state). As the instantiation and configuration of virtual machine instances may, in some embodiments, require several components to effectuate and manage configuration, interaction, and the like, the operations of a given functional block as presented can involve suboperations involving several disparate components, services, etc. Accordingly, enforcement of immutability of the configuration and/or functionality of a given functional block may involve the coordination and participation of some, if not all, of the components, services, etc. involved in operating the virtual machine instance.

For example, a requestor, such as a client device, submits a request to, e.g., an instance service or associated interface, to mark one or more functionalities associated with an instance as immutable. The instance service then propagates the immutability request to one or more components of a management subsystem, including information identifying the specific functionality/ies to be set as immutable, as well as the instance(s) to which the immutability command applies. In some cases, the immutability information is further propagated to an instance manager or virtualization layer associated with the instance. The instance manager, as described in detail below, may further enforce the immutability of the functional block at a lower level of abstraction.

However, while some of the functionality and/or attributes that can be set as immutable are directly manipulable within the instance itself, or possibly within a configuration interface exposed to an associated client device, at least some of the functionality for which immutability is enforced may not necessarily be visible or otherwise observable by the client device. In some cases, such functionality may be internal to the operations of an implementing virtual computer system service or computing resource service provider, and thus not directly manipulable by the client device or within the instance.

Accordingly, when an attempted change (e.g., whether from the protected instance, or from outside of it) involves a configuration change to or involving one or more of the management subsystem components and affecting the instance and the immutable functional block, the immutability information is used to determine whether the configuration change can be made without affecting the protected instance or functional block. If it cannot, then the change is rejected. To the extent that a configuration change occurs that involves the instance itself, or at the very least, the instance manager or the virtualization layer, the change may be temporarily made locally to the instance or the instance manager, but then when the instance manager attempts to effectuate the change to the relevant upstream components of the management subsystem, those management subsystem components may reject the change. Synchronously to the rejection, or in some cases, asynchronously, the state reflected by the relevant management subsystem components and that of the instance and/or the instance manager are synchronized to reflect the rejection.

In one example, instances configured such that specific (or, in some cases, all) functional blocks thereof are set as immutable, may be utilized to implement the management subsystem components (or a portion thereof) themselves. Such instances may be configured such that, e.g., the functionality of such control instances is hardened (that is, impervious to inadvertent or intentional changes that affect the functional capability and specific configuration of, e.g., the implemented management subsystem components). As may be appreciated, the functionality, availability, and configurability of other instances reliant on the management subsystem components executing on an instance requires a high level of immutability of several functionalities provided by, and supporting, the execution of the instance.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a representational flow of an immutability request associated with one or more instances through components of a virtual computer system service, in accordance with some embodiments.

One or more instances 114, 116, such as virtual machine instances (and as described in further detail below) include functional blocks that are configurable to be immutable (i.e., unchangeable from a designated configuration or state) (e.g., instance 116, denoted with a lock icon). In some embodiments, the instantiation and configuration of the instances 114, 116, may be performed by one or more components of a management subsystem 108. The management subsystem 108, in concert with the instance service 106, effectuates and manages configuration, interaction, coordination, and the like, of operations of the instances 114, 116, as well as that of the functional blocks on which the instances 114, 116 rely.

As described herein, functional blocks may include functionality inherent to, or at least partly exposed to, the instances. For example, functional blocks may include networking functional blocks, storage functional blocks, access control to, e.g., resources (whether internal or external to the instance), the instance itself, and the like (such as by way of access control lists and/or access policies), virtualization configuration information (e.g., amount of processing power, memory, storage space, etc.), and the like. From a practical perspective, some of such functional blocks may be directly observed and/or manipulable from the instance itself, or from an interface (e.g., a control panel) used to manage one or more instances. As one example, a networking functional block may involve network configuration associated with one or more instances, where the networking configuration includes firewall configuration (e.g., rules), network and other access control lists (ACLs), security groups, IP addresses (e.g., elastic or virtual IP addresses), network interfaces (e.g., elastic or virtual network interfaces), network routing tables, and the like.

However, in some embodiments, not all of the attributes or functionalities represented or otherwise associated with the functional block may be exposed. For example, internal networking routing tables, such as those that map incoming and outgoing packets (relative to an instance) to destinations within and outside of a computing resource provider's resources, may be internal to the functioning of the computing resource service provider and/or the virtual computer system service, and thus only indirectly manipulable (or not at all manipulable) by a customer of the provider, service, or instance. Immutability of a given functional block, therefore, involves not only immutability of functionality exposed to the customers/client devices and instances, but also that which is not (e.g., the aforementioned internal functionality).

Immutability may, in some embodiments, may include "soft" immutability. For example, "soft" immutability may entail locking functional blocks from changes until the immutability is intentionally removed (e.g., by an authorized administrator), and such changes may not necessarily require a running instance to be terminated and reinvoked with the new immutability settings. As another example, immutability may be set for a given functional block for certain types of changes, or changes caused as a result of certain actions or events, but not others (e.g., immutability may be requested, processed, and enforced for all changes except software updates or other maintenance).

In some embodiments, a given functional block as presented, e.g., via an interface provided to the client device 102 (as described in further detail below), can involve suboperations involving several disparate components, services, etc. Accordingly, enforcement of immutability of the configuration and/or functionality of a given functional block may involve the coordination and participation of some, if not all, of the components, services, etc. involved in operating the virtual machine instance.

For example, a requestor, such as a client device 102, submits a request 104 to, e.g., an instance service 106 via an associated interface, to mark one or more functionalities associated with an instance as immutable (immutability propagation being denoted by a lock icon in the figures). The request may be made in connection with a request (which may be the same request) to initialize or instantiate a new instance, or to initialize or instantiate a suspended instance. The request may, in some cases, be made such that an existing (and/or already running) set of instances may be started, restarted, or duplicated, as partly or entirely immutable with respect to the functional blocks being set as such. Alternatively, the request may be made separately from other requests, such as a request to instantiate an instance. Such a request may be made via a user interface, an application programming interface (API), webservice call, or the like.

To process the immutability request and lock the functional block(s) from changes, the instance service 106 then propagates the immutability request 104 to one or more components of a management subsystem 108, including information identifying the specific functional blocks to be set as immutable, as well as the instance(s) to which the immutability command applies. In some cases, the immutability information is further propagated to an instance manager 112 or virtualization layer associated with the instance 116. The instance manager 112, as described in detail below, may further enforce the immutability of the functional block at a lower level of abstraction, as it executes on the physical hardware 110 and provides mappings between the inputs and outputs of the instances 114, 116 and that of the physical hardware 110.

However, as previously mentioned, while some of the functionality and/or attributes that can be set as immutable are directly manipulable within the instance itself, or possibly within a configuration interface exposed to an associated client device (e.g., 102), at least some of the functionality for which immutability is enforced may not necessarily be visible or otherwise observable by the client device. In some cases, also as previously mentioned, such functionality may be internal to the operations of an implementing virtual computer system service or computing resource service provider, and thus not directly manipulable by the client device or within the instance.

Accordingly, when an attempted change (e.g., whether from the protected instance, or from outside of it) involves a configuration change to or involving one or more of the management subsystem 108 components and affecting the instance 116 and the immutable functional block thereof, the immutability information is used (e.g., by the management subsystem 108, and/or the instance manager 112) to determine whether the configuration change can be made without affecting the protected instance 116 or functional block. If it cannot, then the change is rejected.

To the extent that a configuration change occurs that involves the instance 116 itself, or at the very least, the instance manager 112 or the virtualization layer, the change may be temporarily made locally to the instance 116 or the instance manager 112. However, when the instance manager 112 attempts to effectuate the change by pushing the change to the relevant upstream components of the management subsystem 108, those management subsystem components 108 may reject the change as they have the pertinent immutability information. Synchronously to the rejection, or in some cases, asynchronously, the state reflected by the relevant management subsystem 108 components and that of the instance 116 and/or the instance manager 112 are synchronized to reflect the rejection. If a given instance is compromised by a rejected change, or if a change somehow occurs with respect to a functional block that is set as immutable, in some embodiments, that instance is suspended or terminated to, e.g., prevent deleterious effects from the change having been rejected and/or having been made in contravention of the immutable status at issue.

The environment such as that illustrated in FIG. 1 may be useful for a provider such as a computing resource provider, wherein the computing resource system responds to requests from customers to mark functional groups or instances as immutable. As discussed above, the computing resource system provides a mechanism to allow customers to set certain functional blocks associated with instances as immutable. The environment in such a case may include additional components and/or other arrangements, such as those illustrated in the networked environment 200 of FIG. 2.

Figure 2:
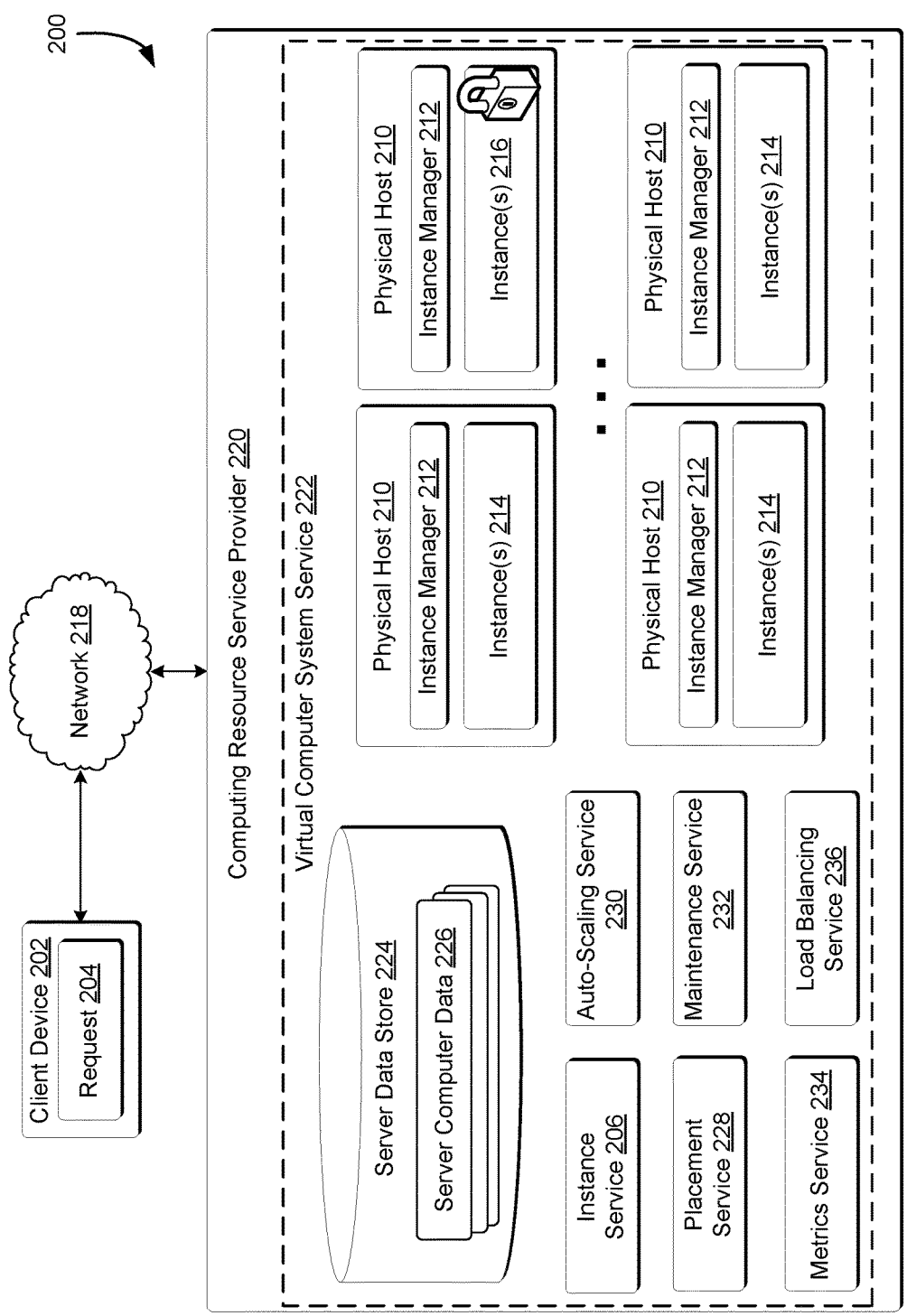
FIG. 2 illustrates an environment illustrating an implementation of a virtual computer system service that processes and effectuates immutability requests, in accordance with some embodiments.

FIG. 2 illustrates an environment illustrating an implementation of a virtual computer system service that processes and effectuates immutability requests, in accordance with some embodiments.

In some embodiments, networked environment 200 includes a computing resource service provider 220 in data communication with a client device 202 and physical hosts 210 over a network 218. In one embodiment, the physical hosts 210 may be one or more computer hardware devices that are used to implement instances 214, 216. For example, the physical hosts 210 may include hardware for implementing types of computing resources, such as storage devices, virtualized storage devices, networking devices, and the like. Additionally, the implemented computing resources may be programmatically and remotely managed by a customer of the computing resource service provider 220, or, in some embodiments, via a user interface (such as a management console as described below). One aspect of managing the instances 214, 216 includes designating instances, or functional blocks associated therewith, as immutable through the facilities just mentioned.

The physical hosts 210 includes a plurality of computer system devices that are each capable of executing one or more instances 214, 216 created by the computing resource service provider 220. In one embodiment, each of the physical hosts 210 is a server that includes a processor, a data store, an input/output bus, and/or other components for executing instances 214, 216. The instances 214, 216 may be virtual machine instances. A virtual machine instance is an instance of a software implementation on a machine (i.e., a computer) that executes programs like a physical machine. For example, each of the physical hosts 210 may be configured to execute an instance manager 212 capable of implementing the instances 214, 216. The instance manager 212 may be a hypervisor, virtualization layer, or another type of program configured to enable the execution of multiple instances 214, 216 on a single physical host 210, for example. As discussed above, each of the instances 214, 216 may be configured to execute all or a portion of an application. Additionally, the network 218 may be similar to the network as described above. The networked environment 200 may span one or more data centers, where each data center may be geographically distinct from each other. Additionally, the networked environment 200 shown in FIG. 2 may be one of several embodiments employed by the computing resource service provider.

In one embodiment, the computing resource service provider 220 provides a virtual computer system service 222 that includes a server data store 224 containing server computer data 226, an instance service 206, a placement service 228, an auto-scaling service 230, a maintenance service 232, a metrics service 234, a load balancing service 236, and/or other components. The server computer data 226 may include data related to the physical hosts 210. For example, in one embodiment, the server data store 224 includes one or more records of server computer data 226. Each one of the records of the server computer data 226 corresponds to the physical hosts 210 of the networked environment 200.

Depending on the nature of the immutability requested, some or all of the server data store 224 containing server computer data 226, the instance service 206, the placement service 228, the auto-scaling service 230, the maintenance service 232, the metrics service 234, the load balancing service 236, and/or other components (e.g., the instance manager 212) may receive information regarding the nature of the immutability requested, an identification of the instance(s) associated with the requested immutability, information regarding the state of the processing of the immutability request, and the like. As will be appreciated, other components not illustrated or described here but are otherwise associated with the computing resource service provider 220 and/or the virtual computer system service 222 may receive such immutability information in connection with an associated request, so as to effectively process the request and render the requested functional block and/or instance as immutable.

The instance service 206 instantiates instances 214, 216 based at least in part on a set of preferences provided by the customer. In one embodiment, the instance service 206 receives, from the customer on the client device 202, a request 204 to create one or more instances 214, 216 and optionally designate one or more functional blocks associated with instance 216 as immutable. In some embodiments, the request 204 may simply be a request to designate immutability for one or more existing (running) instances. The request 204 received from the customer on the client device 202 may also indicate a time to start execution of the requested instances 214, 216 or a time at which to commence propagating the immutability command(s).

In response to receiving the request, the instance service 206 instantiates instances 214, 216 and/or sends immutability information to the other service(s) and/or instance(s)/instance manager. In some embodiments, the auto-scaling service 230 receives the request and transmits a command to the instance service 206 to instantiate the instances 214, 216 such that the instances are associated with an auto-scaling group, from which a client device 202 and/or an auto-scaling service 230 may allocate a variable number of instances based on demand, a command of the auto-scaling service or client device 202, etc.

The customer may interact with the computing resource service provider 220 (via appropriately configured and authenticated API calls) to provision, operate virtual, and manage instances that are instantiated on physical hosts 210 and operated by the computing resource service provider 220. For example, the virtual computer system service 222 may present, via an interface associated therewith (e.g., through the instance service 206), a management console user interface. The management console may be exposed to the customers as a webpage, by interacting with the webpage (e.g., through a browser application) the customer may cause API calls to be generated. The generated API calls may cause the computing resource service provider 220 or component thereof to perform various operations indicated by the customer, such as electing immutability for one or more functionalities and/or attributes.

The instances 214, 216 may be used for various purposes, such as to operate as servers supporting a website, to operate business applications or, generally, to serve as computing power for the customer. Other applications for the instances 214, 216 may be to support database applications, electronic commerce applications, business applications and/or other applications. Although the instance service 206 is shown in FIG. 2, any other computer system or computer system service may be utilized by the computing resource service provider 220 such as a computer system or computer system service that does not employ virtualization or instantiation and instead provisions computing resources on dedicated or shared computers/servers and/or other physical devices.

The placement service 228 provisions the instances 214, 216 to one or more of the physical hosts 210. In one embodiment, the placement service 228 determines the physical hosts 210 to provision the new instances 214, 216 based, in some embodiments, at least in part on the determinations of the auto-scaling service 230. For example, the placement service 228 may identify one or more physical hosts 210 with the appropriate capacity to execute the instances 214, 216. To this end, the placement service 228 determines the capacity of each physical host 210 from the resource data (server computer data) 226 stored in the data store 224 and accordingly provisions the instances 214, 216, as will be described. The auto-scaling service 230 automatically scales the capacity of a collection of previously requested instances 214, 216 up or down based at least in part on circumstances defined by the customer that requested the instances 214, 216. To the extent that placement by a placement service 228 would affect the configuration of one or more functional blocks designated as immutable, the placement service 228 makes its decisions in a fashion that respects the requested immutability.

The maintenance service 232 schedules maintenance, software updates, and/or firmware updates for the physical hosts 210. In one embodiment, the maintenance service 232 schedules the maintenance and software updates at an appropriate time based at least in part on the available capacity of the physical hosts 210. For example, the maintenance service 232 may schedule the maintenance and software updates at a time when the respective physical host 210 has a projected availability. In one embodiment, the maintenance service 232 may patch and restart the physical hosts 210 when the maintenance service 232 determines that the physical host 210 is not hosting any instances 214, 216. Additionally, the maintenance service 232 may patch virtual machines associated with the instance 242 if necessary prior to instantiating new images that are associated with the respective virtual machines. For example, the maintenance service 232 may schedule a patch of the machine image based at least in part on the health status of the instances 214, 216. In one embodiment, no additional instances may be provisioned on the physical host 210 until the scheduled maintenance is completed. In some embodiments, actions taken by the maintenance service 232 may run counter to immutability flags set for one or more instances and/or functional blocks associated therewith. In such embodiments, changes attempted to be initiated by the maintenance service 232 will either be rejected by the instance manager 212 associated with the relevant instance(s) 216 or, in some embodiments, the maintenance service 232 will not initiate such operations against the relevant instance(s) 216.

The maintenance service 232 may also periodically or aperiodically check the health status of the instances 214, 216. The health check may include determining the load, utilization, and operation of various components of the instances 214, 216 such as the central processing unit, memory, networking interface, operating system, application, and other components of the instances 214, 216. In various embodiments, when the maintenance service 232 determines that an instance 214, 216 is unhealthy, based at least in part on the health check, the maintenance service 232 or other component of the service provider 220 may initiate a workflow to move the unhealthy instances into standby. Additionally, if the maintenance service 232, determines that a previously unhealthy instance has returned to a healthy status the maintenance service 232 or other component of the service provider 220, such as the auto-scaling service 230, may move the instances 214, 216 into service.

The metrics service 234 may be responsible for collecting resource data (e.g., server computer data 226) corresponding to the instances 214, 216. The resource data obtained by the metrics service 234 may indicate the utilization of various components of the instances 214, 216 such as the central processing unit, memory, networking interface, operating system, applications, and other components of the instances 214, 216. This information may be used for a variety of different purposes. Additionally, the information may be used by the maintenance service 232 to determine the health of an instance 214, 216 and/or a physical host 210. The metrics service 234 may obtain and aggregate utilization information for some or all of the instances 214, 216. Furthermore, when instances 214, 216 are placed in standby, the metrics service 234 may receive a command to remove the instances 214, 216 from the set of instances 214, 216 for which the metrics service 234 collects and/or aggregates utilization information.

A load balancing service 236 may be offered to customers of a computing resource service provider 220 in order to facilitate request processing by instances 214, 216 of the customer. In various embodiments, the instances 214, 216 may be assigned to an auto-scaling group and the load balancing service 236 may distribute traffic to available instances 214, 216, such as the instances 214, 216 assigned a given auto-scaling group (or other designated group).

For example, the customer may operate a website using instances 214, 216 using the resources of computing resource service provider 220. Additionally, the website may receive requests from multiple other customers over the network 218. The computing resource service provider 220 may configure a load balancer of the load balancing service 236 to direct the requests to the instances 214, 216 executing the website in such a way that the load generated by processing the requests is distributed among the instances 214, 216 executing the website. The load balancing service 236 may be a computer system or virtual computer system configured to distribute the request to the instances 214, 216 assigned to the load balancer in order to optimize resource utilization and/or avoid overloading a particular physical host 210. For example, the load balancer may include physical hardware connected to a server rack or otherwise included in a data center. In another example, the load balancer may include one or more virtual machines supported by physical host 210.

Figure 3:
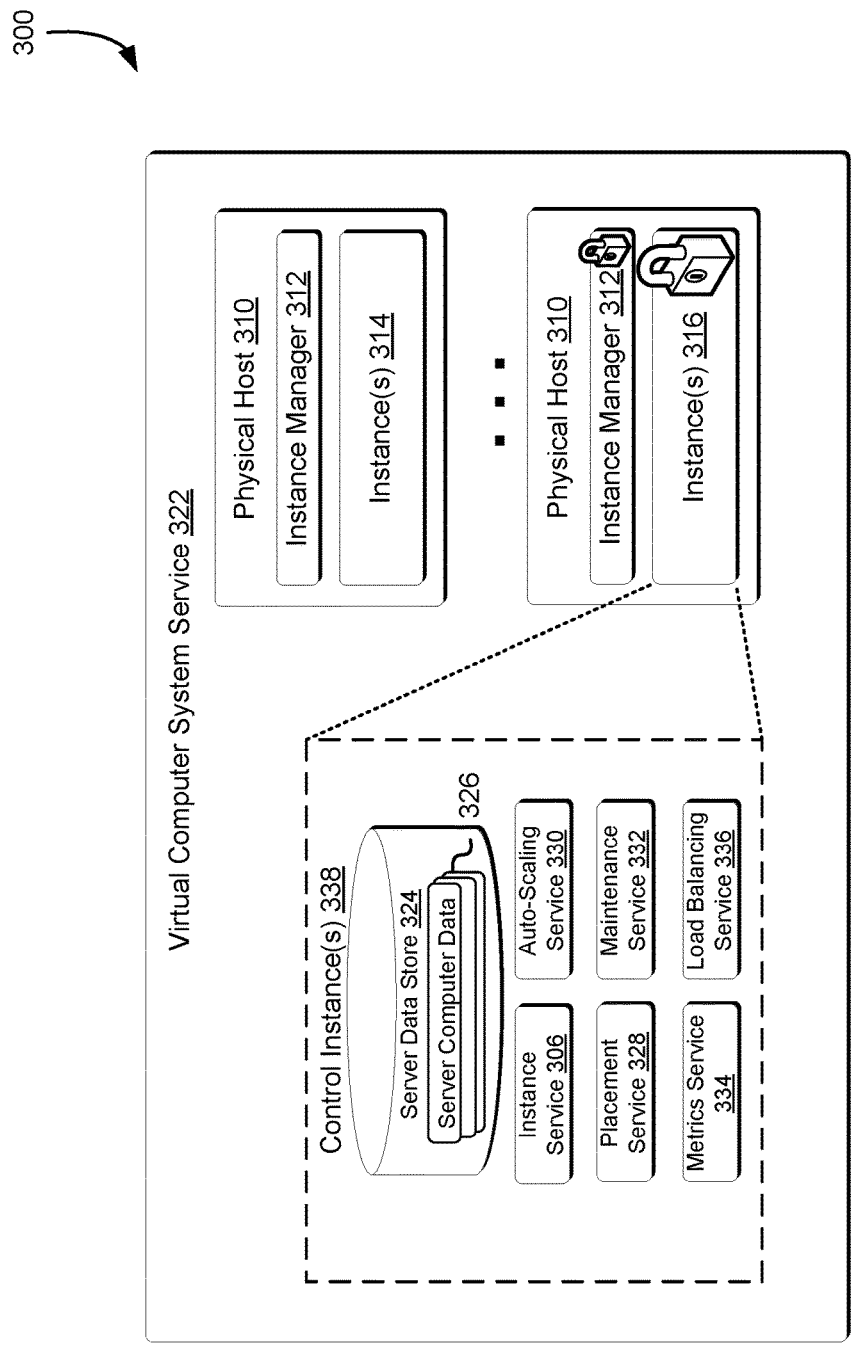
FIG. 3 illustrates an environment implementing one or more management components of a virtual computer system service in one or more immutable control instances, in accordance with some embodiments.

FIG. 3 illustrates an environment implementing one or more management components of a virtual computer system service in one or more immutable control instances, in accordance with some embodiments.

As described in connection with at least FIG. 2 above, a virtual computer system service 322 may implement a variety of components to generate, manage, and control running instances, such as virtual machine instances. Similarly to previously described, an implemented virtual computer system service 322 may include physical hosts 310 that implement instance managers 312, such as virtualization layers, to generate and manage instance(s) 314, 316 on commands from management components, such as an instance service 306, auto-scaling service 330, placement service 328, maintenance service 332, metrics service 334, and load balancing service 336, as backed by a server data store 324 having server computer data 326 associated with, e.g., instance(s) created on and/or running on each physical host 310.

In some embodiments, instance(s) 316 configured such that specific (or, in some cases, all) functional blocks thereof are set as immutable, such that they are effectively immune to mistaken configuration updates, accidental detachment, unintentional modification of routing tables and/or ACLs, etc., may be utilized as control instance(s) 338 to implement the management subsystem components (or a portion thereof) themselves. Such control instances 338 may be configured such that, e.g., the functionality of such control instances are hardened (that is, impervious to inadvertent or intentional changes that affect the functional capability and specific configuration of, e.g., the implemented management subsystem components).

As may be appreciated, the functionality, availability, and configurability of other instances reliant on the management subsystem components executing on an instance requires a high level of immutability of several functionalities provided by, and supporting, the execution of the instance. In some embodiments, one or more management subsystem components, or similar components thereof, may execute on the bare metal of, e.g., a physical host 310, to instantiate the control instance(s) 338, which in turn execute, generate, and manage other instance(s), such as those requested and/or managed by customers of the virtual computer system service 322. By virtualizing the management subsystem components, many of the advantages of virtualization (e.g., demand scalability, ease of replacement and/or maintenance, etc.) may be applied to such components, while the immutability imputed to the control instance(s) 338 allows for the virtualized management subsystem components to enjoy the same security and accidental manipulation resistance as similar components implemented at a bare metal level.

Figure 4:
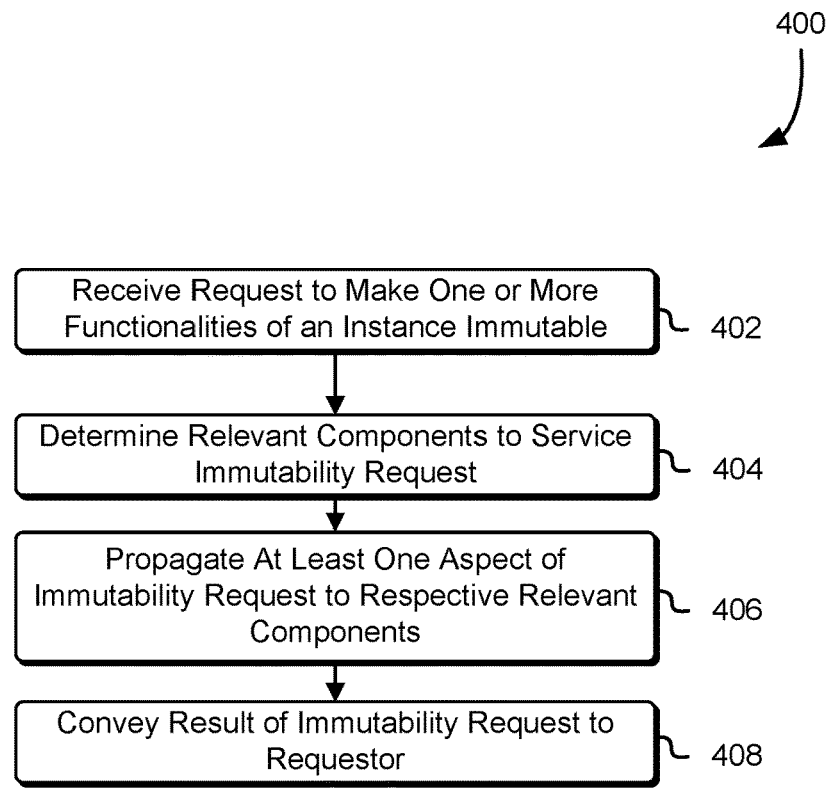
FIG. 4 illustrates a process for propagating immutability of one or more components associated with an instance, in accordance with some embodiments.

FIG. 4 illustrates a process for propagating immutability of one or more components associated with an instance, in accordance with some embodiments.

At step 402, an interface, such as of a virtual computer system service as previously described, receives a request to flag one or more functionality blocks associated with an instance as immutable. Such a request may be received programmatically (if the interface is a programmatic interface), or via selection in a user interface (if the interface is a graphical user interface). Additionally, as previously mentioned, the request may be incident to, the same as, or separate from a request to create or instantiate the instance in question.

At step 404, a component of the virtual computer system service, such as an instance service or other management component, determines which components are relevant to the immutability request. In some embodiments, all management components are determined to be relevant when an immutability request is involved.

At step 406, a management subsystem component or an instance manager (as applicable) propagates, or causes propagation of, at least one relevant aspect of the immutability request to the components determined as relevant in step 404. Such aspects may include immutability information identifying, e.g., the nature of the immutability, the functional block to set as immutable, the relevant instance(s) to which the immutability and/or functional block applies, and the like.

At step 408, to the extent that the immutability request has been appropriately and verifiably propagated to a sufficient number of the components so as to render the requested entity immutable, feedback regarding the status of the immutability request is presented through, e.g., the aforementioned interface of step 402 and elsewhere herein to the requestor.

Figure 5:
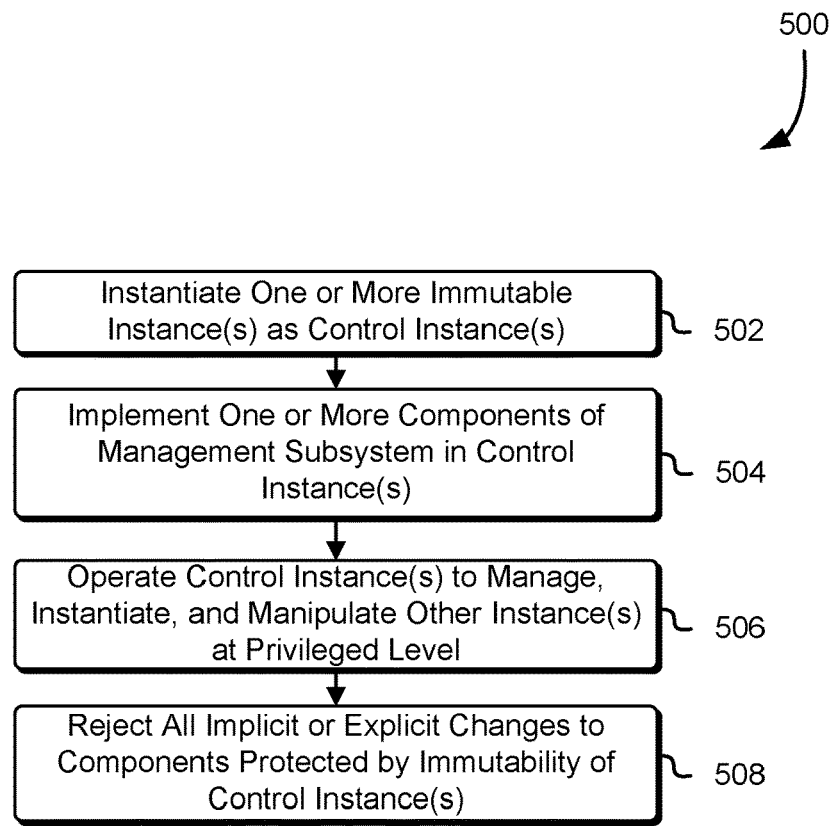
FIG. 5 illustrates a process for implementing, in an immutable control instance, one or more management components associated with the administration of a virtual computer system service, in accordance with some embodiments.

FIG. 5 illustrates a process for implementing, in an immutable control instance, one or more management components associated with the administration of a virtual computer system service, in accordance with some embodiments.

At step 502, one or more control instance(s) is instantiated as immutable, such as using the components and steps described above in connection with FIG. 4 as well as the environments described in FIGS. 1-3 above.

At step 504, one or more components of the management subsystem, as described herein, are implemented in the immutable control instance(s) instantiated in step 502. Such instances are, at step 506, operated to manage, instantiate, and/or manipulate other instance(s), such as those managed by customers of an implementing computing resource service provider and/or virtual computer system service, but are, by virtue of their immutability, privileged and/or hardened such that unwanted or unauthorized configuration and/or other operational changes are made impossible or infeasible.

At step 508, should such an explicit and/or implicit configuration or operational change affect the control instances, such changes are rejected according to the techniques described elsewhere herein.

Figure 6:
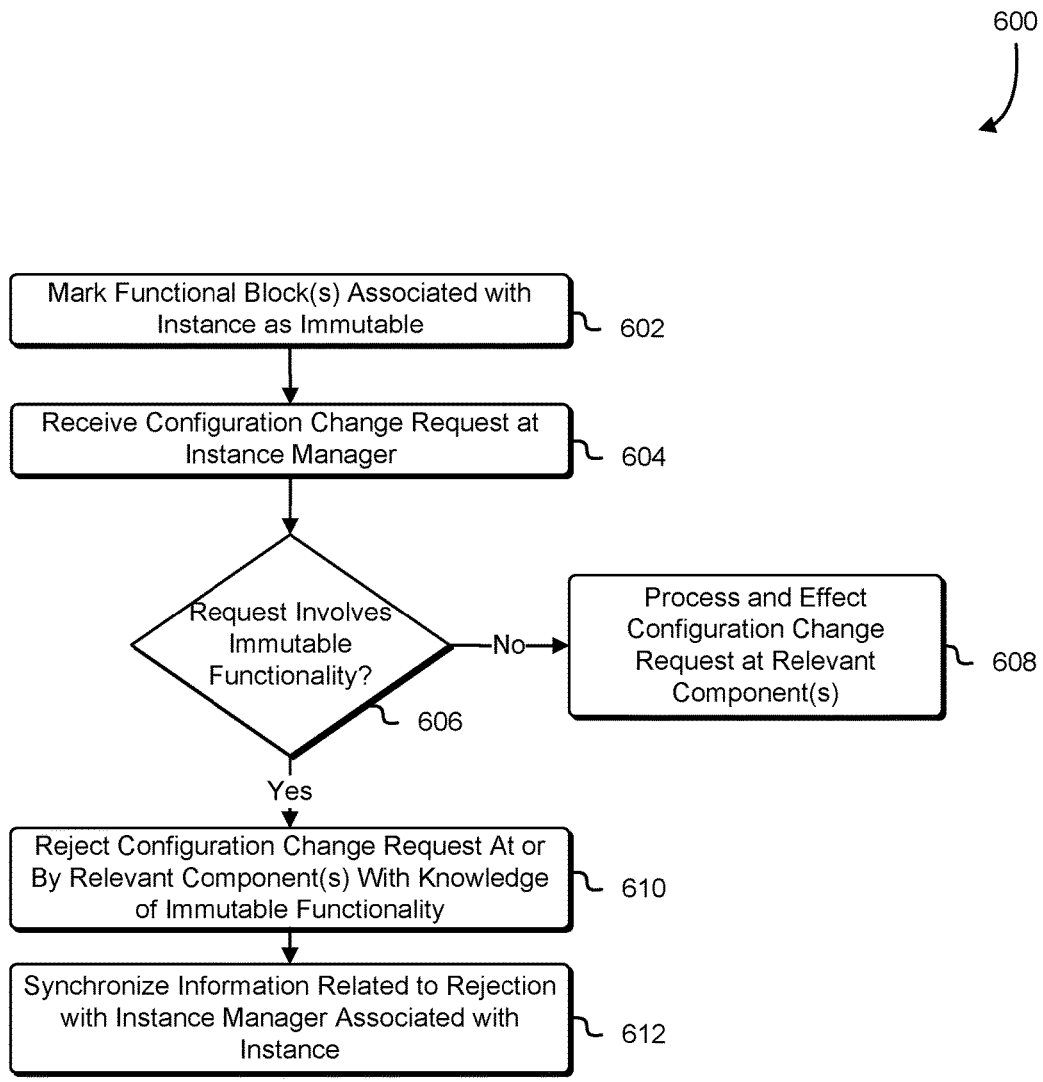
FIG. 6 illustrates a process for handling configuration change requests affecting one or more immutable instances or components, in accordance with some embodiments.

FIG. 6 illustrates a process for handling configuration change requests affecting one or more immutable instances or components, in accordance with some embodiments.

At step 602, a component, such as a functional block associated with one or more instances, is marked as immutable, e.g., via the techniques previously described. At step 604, the instance manager receives a configuration change request, e.g., generated by the instance itself, or via an update or other dispatch from a component that notifies the instance manager of its intention to update the instances associated therewith. In some embodiments, the configuration change request may be directly or indirectly authorized and/or valid from the perspective of the initiator of the change request, the instance manager, the instance itself, etc., but by virtue of an affected functional block being flagged as immutable, the otherwise valid/authorized change request may be rejected.

At decision point 606, if the request does not involve functional blocks or attributes set as immutable (e.g., at step 602), the configuration change, which in some cases is propagated to upstream management components and/or other associated services of a computing resource service provider, is executed thereby at step 608, and the change is effectuated.

However, if the request involves functionality flagged as immutable, the configuration change is, in some embodiments, nevertheless propagated to upstream components. To the extent those upstream components have knowledge of the immutable functionality, those components reject the configuration change at step 610.

At step 612, the unsynchronized state of the instance manager (heretofore reflecting that the configuration change has been made) is synchronized with that of the upstream components (which rejected the change) so as to revert to a state reflecting that the configuration change was not effectuated.

Figure 7:
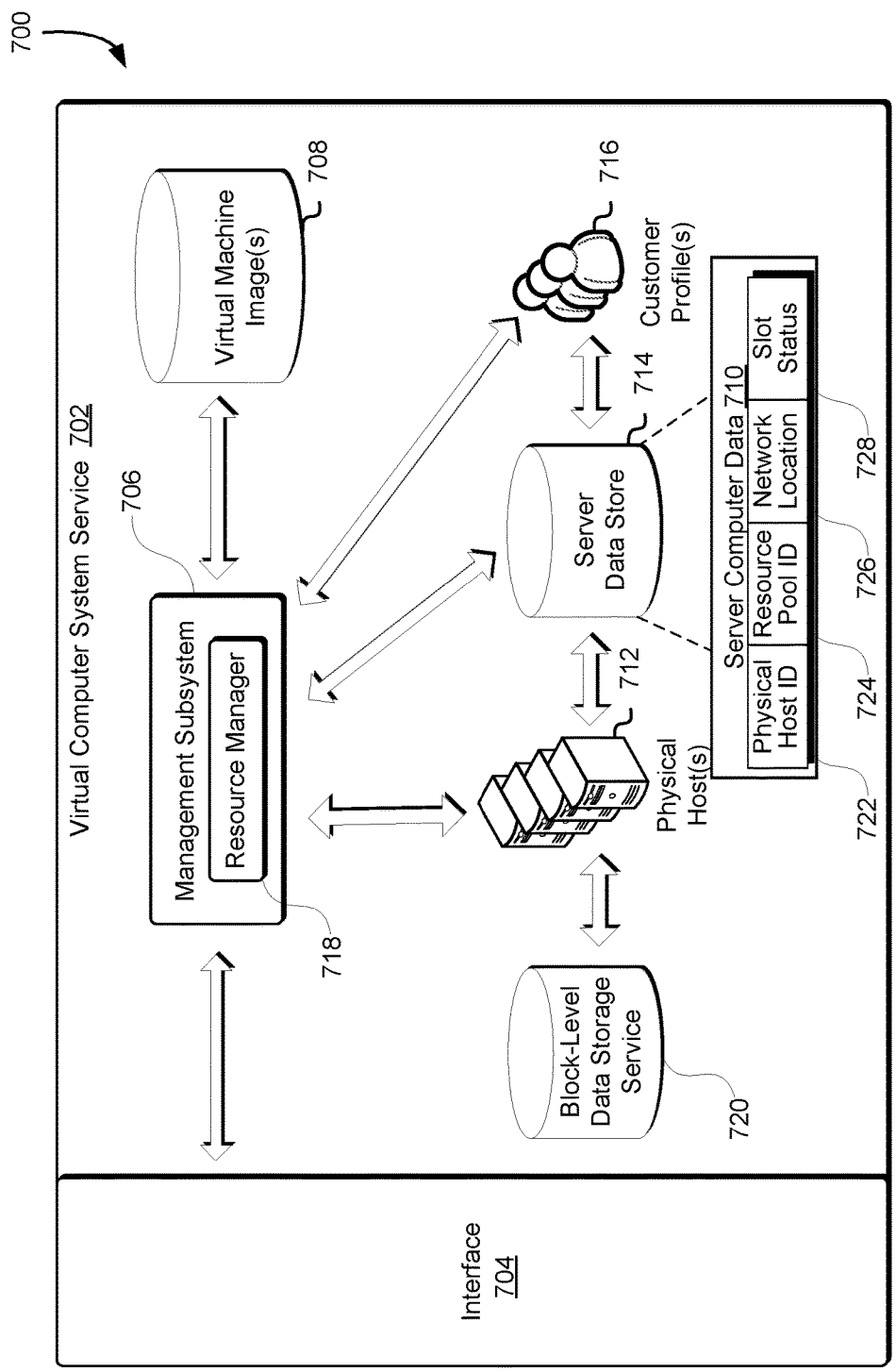
FIG. 7 illustrates an environment implementing a virtual computer system service that interacts with one or more other components of a computing resource service provider, in accordance with some embodiments.

FIG. 7 illustrates an environment 700 implementing a virtual computer system service that interacts with one or more other components of a computing resource service provider, in accordance with some embodiments.

One or more virtual machine images 708 are instantiated within one or more physical hosts 712 upon customer request in accordance with at least one embodiment. As previously mentioned, the virtual computer system service 702 may provide customers with a customer interface 704, such as a management interface or API, that enables a customer to access the virtual computer system service 702 via a client device.

A customer may utilize the customer interface 704 through one or more communications networks, such as the Internet. The customer interface 704 may contain certain security safeguards to ensure that the customer has authorization to access the virtual computer system service 702. For instance, in order to access the virtual computer system service 702, a customer may need to provide a username and a corresponding password or encryption key when using the customer interface 704. Additionally, requests (e.g., API calls) submitted to the customer interface 704 may require an electronic signature generated using a cryptographic key such that the electronic signature is verifiable by the virtual computer system service 702, such as by an authorization system.

Once the customer has gained access to the virtual computer system service 702 through the customer interface 704, the virtual computer system service 702 may allow the customer to interact, through the customer interface 704, with a management subsystem 706. For instance, the management subsystem 706 may enable a customer to remotely provision a virtual machine instance, and the one or more physical hosts 712 that will instantiate the virtual machine instance can be selected by a resource manager 718 (e.g., a placement service, auto-scaling service, load balancing service, and/or other component previously described). A customer may use the customer interface 704 and the management subsystem 706 to generate a virtual machine instance that includes an operating system and a variety of applications suited to the customer's needs.

The operating system and the various applications may be maintained in data storage in the form of virtual machine images 708. The virtual computer system service 702 may maintain a variety of virtual machine images 708 based on specific customer preferences, as specified in the management subsystem 706. When a customer submits a request for provisioning a virtual machine instance through the management subsystem 706, the virtual computer system service 702 may identify the machine image the customer has requested and allocate the resources necessary (e.g., the processors and random-access memory (RAM) required to operate the components of the machine image) to process the machine image. The machine image may be instantiated on one or more physical hosts 712 that is operably connected to a block-level data storage service 720 that can provide object level and/or block level memory storage for one or more physical hosts 712.

In one example, a customer, through the customer interface 704, submits a request to the virtual computer system service 702 to provision and/or reserve one or more physical host 712 for his/her virtual machine instances. This request may be submitted through a web service or other API call to the service 702 and may include various parameters such as an account identifier for the customer, virtual machine instance types, information such as a number of processors, immutability request for the instance or associated functional block(s), amount of memory, amount of networking capacity, etc. Additionally, if the customer wishes to reserve a server, the request may similarly be submitted through a web service or other API call to the service 702.

In response to the request, the management subsystem 706 may access a server data store 714 to identify, from a pool of physical hosts 712 having free capacity, one or more physical host 712 that may be reserved for the customer to fulfill his/her request, or the like. In some examples, the physical hosts 712 can be a part of a general pool of resources or a pool of defective resources as discussed above.

In some examples, the virtual computer system service 702 may maintain a general pool of physical hosts 712 that the management subsystem 706 may utilize to identify one or more physical hosts, or a portion thereof, that may be allocated to the customer for use. Once the management subsystem 706 has identified the one or more physical hosts 712 to be allocated to the customer (e.g., via corresponding customer profile(s) 716), the management subsystem 706 may access the server data store 714 to specify, within a database, which physical hosts 712, or portions thereof have been allocated for use of the customer.

In various examples, the server data store 714 can store any suitable information (e.g., server computer data 710), about physical hosts 712, including a physical host identifier 722, a resource pool identifier 724 (e.g., whether the resource is part of a general resource pool, a defective resource pool, or the like), a network location 726 and a slot status 728.

Once one or more physical hosts 712 have been allocated for the customer, the customer, through the interface 704, can submit a request (e.g., a web service or other API call) to the virtual computer system service 702 to instantiate one or more virtual machine images 708 onto one of these allocated physical host(s) 712 and/or a portion thereof. For instance, in an embodiment, the customer, through the interface 704, submits a request to the management subsystem 706 (e.g., a web service or other API call) to obtain an identifier for each physical host 712 allocated for the customer or otherwise being utilized by the customer.

Once the customer has obtained these one or more server identifiers from the management subsystem 706, the customer may generate a request that may include an identifier corresponding to the physical host(s) 712 that should be used for instantiating the virtual machine image 708. The management subsystem 706 may instantiate the virtual machine image 708 on the selected physical host(s) 712, if the physical host(s) 712 have sufficient capacity to support the virtual machine instance. In some embodiments, the management subsystem 706 may include a placement service, which, as previously discussed, may be configured to select from the plurality of servers 712 a server for the virtual machine instance in a manner that respects a plurality of dedications in the server data store 714.

Figure 8:
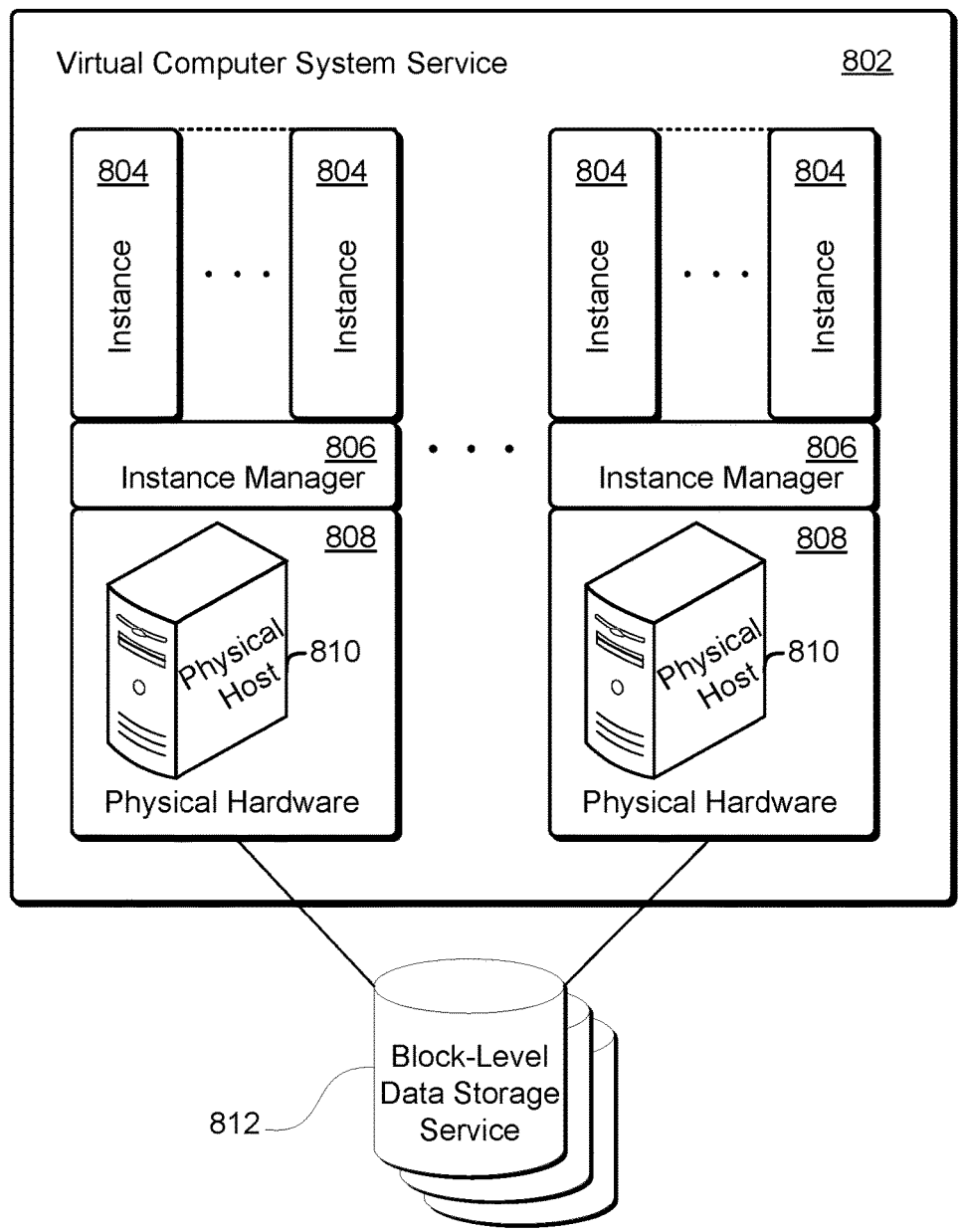
FIG. 8 illustrates an environment implementing a virtual computer system service having access to physical hardware on which one or more instances execute, in accordance with some embodiments.

FIG. 8 illustrates an environment implementing a virtual computer system service having access to physical hardware on which one or more instances execute, in accordance with some embodiments.

The virtual computer system service 808, which can comprise physical hardware 808, can be used by a computing resource service provider for providing computation resources for customers. The physical hardware 808 may include one or more physical hosts 810. The physical hosts 810 may be any device or equipment configured to execute instructions for performing data computation, manipulation, or storage tasks, such as a computer or a server.

A physical host 810 may be equipped with any needed processing capability including one or more processors, such as a central processing unit (CPU), a graphics processing unit (GPU) or a digital signal processor (DSP), memory, including static and dynamic memory, buses, and input and output ports that are compliant with any handshaking, communications or data transfer protocol. The physical hardware 1540 may also include storage devices, such as storage disks and tapes, networking equipment and the like and/or can be coupled to block-level data storage service 812.

A instance manager 806 (e.g., a virtualization layer) in the computing resources service provider can enable the physical hardware 808 to be used to provide computational resources upon which one or more instances 804 may operate. The instance manager 806, as previously mentioned, may be any device, software, or firmware used for providing a virtual computing platform for the instances 804. The instance manager 806 may include various virtual computer components, such as one or more virtual CPUs, virtual memory and the like. The instances 804 may be provided to the customers of a computing service resource provider and the customers may run an operating system or an application on one or more instances or other instances (e.g., virtual machines) 804. Further, the computing service resource provider may use one or more of its own instances (e.g., virtual machines) 804 for executing its applications, including one or more aspects of the management subsystem of the virtual computer system service 802, as previously mentioned. In some embodiments, instances 804 used for such a purpose are set as immutable (or have associated blocks of functionality designated as immutable). Examples of the instance manager 806 include a hypervisor.

The instance managers 806 can provide a host activity report associated with the physical hardware 808, one or more physical hosts 810 or the one or more instances 804. The host activity report may include utilization, activity or operational information or statistics for the physical hardware 808, physical hosts 810, instances 804 or applications that are executed on the physical hosts 810 or the instances 804. The information included in the host activity report may be gathered or compiled over an interval of time or taken at one or more snapshots in time.

Figure 9:
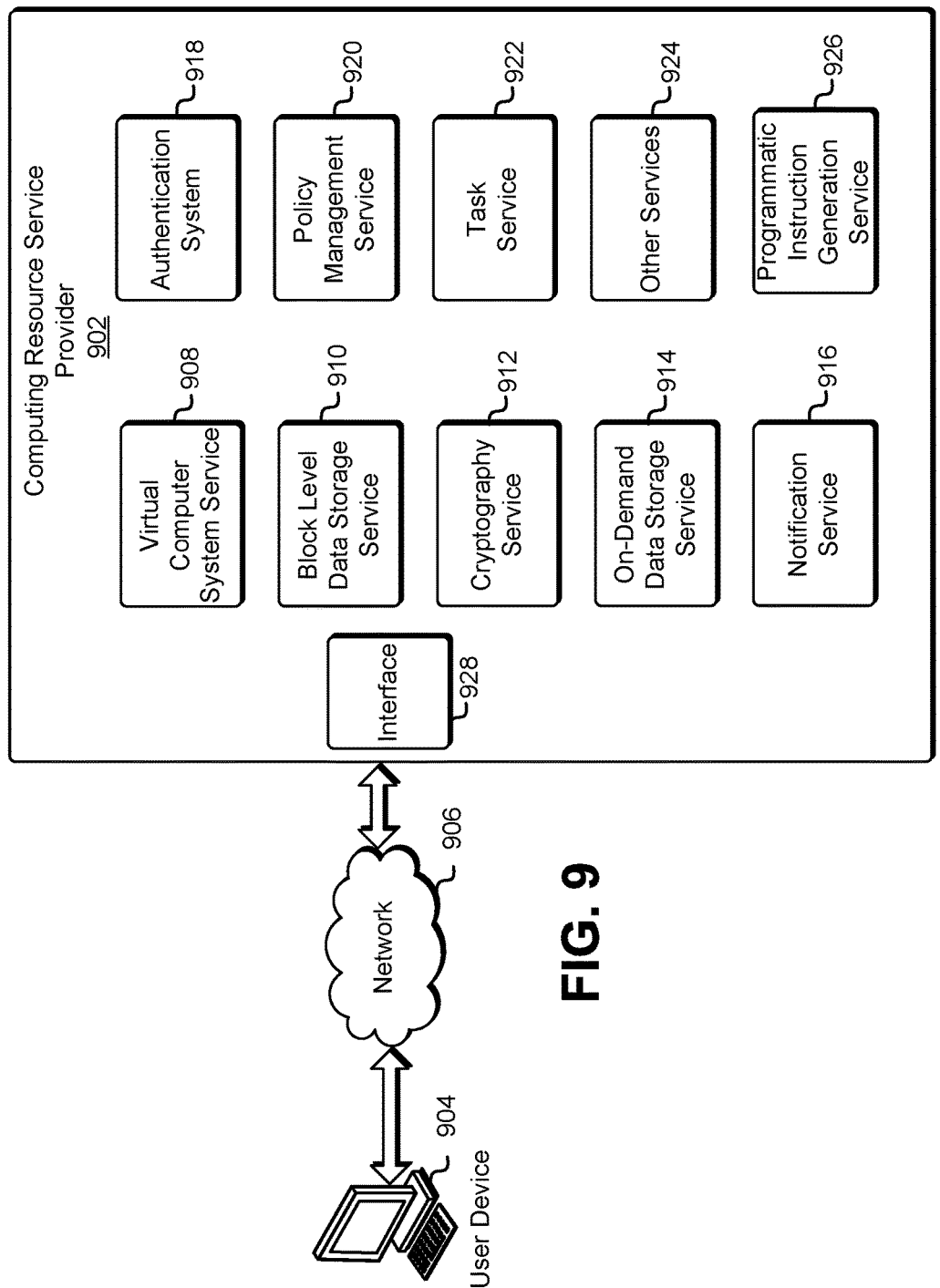
FIG. 9 illustrates an environment implementing a computing resource service provider providing a plurality of computing services, in accordance with some embodiments.

FIG. 9 illustrates an environment implementing a computing resource service provider providing a plurality of computing services, in accordance with some embodiments.

The computing resource service provider 902 may provide a variety of services to the customer 904 and the customer 904 may communicate with the computing resource service provider 902 via an interface 928, which may be a web services interface or any other type of customer interface. While FIG. 9 shows one interface 928 for the services of the computing resource service provider 902, each service may have its own interface and, generally, subsets of the services may have corresponding interfaces in addition to or as an alternative to the interface 928. The customer 904 may be an organization that may utilize one or more of the services provided by the computing resource service provider 902 to maintain and deliver information to its employees, which may be located in various geographical locations. Additionally, the customer 904 may be an individual that utilizes the services of the computing resource service provider 902 to deliver content to a working group located remotely. As shown in FIG. 9, the customer 904 may communicate with the computing resource service provider 902 through a network 906, whereby the network 906 may be a communication network, such as the Internet, an intranet or an Internet service provider (ISP) network. Some communications from the customer 904 to the computing resource service provider 902 may cause the computing resource service provider 902 to operate in accordance with one or more example described herein or a variation thereof.

The computing resource service provider 902 may provide various computing resource services to its customers. The services provided by the computing resource service provider 902, in this example, include a virtual computer system service 908, a block-level data storage service 910, a cryptography service 912, an on-demand data storage service 914, a notification service 916, an authentication system 918, a policy management service 920, a task service 922 and one or more other services 924. It is noted that not all examples described herein include the services 908-924 described with reference to FIG. 9 and additional services may be provided in addition to or as an alternative to services explicitly described herein. As described herein, each of the services 908-924 may include one or more web service interfaces that enable the customer 904 to submit appropriately configured API calls to the various services through web service requests. In addition, each of the services may include one or more service interfaces that enable the services to access each other (e.g., to enable a virtual computer system of the virtual computer system service 908 to store data in or retrieve data from the on-demand data storage service 914 and/or to access one or more block-level data storage devices provided by the block level data storage service 910).

The virtual computer system service 908, as variously described in connection with FIGS. 1-8 above, may be a collection of computing resources configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the computing resource service provider 902. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 908 is shown in FIG. 9, any other computer system or computer system service may be utilized in the computing resource service provider 902, such as a computer system or computer system service that does not employ virtualization or instantiation and instead provisions computing resources on dedicated or shared computers/servers and/or other physical devices.

The block-level data storage service 910 may comprise one or more computing resources that collectively operate to store data for a customer 904 using block-level storage devices (and/or virtualizations thereof). The block-level storage devices of the block-level data storage service 910 may, for instance, be operationally attached to virtual computer systems provided by the virtual computer system service 908 to serve as logical units (e.g., virtual drives) for the computer systems. A block-level storage device may enable the persistent storage of data used/generated by a corresponding virtual computer system where the virtual computer system service 908 may only provide ephemeral data storage.

The computing resource service provider 902 also includes a cryptography service 912. The cryptography service 912 may utilize one or more storage services of the computing resource service provider 902 to store keys of the customers in encrypted form, whereby the keys may be usable to decrypt customer keys accessible only to particular devices of the cryptography service 912.

The computing resource service provider 902 further includes an on-demand data storage service 914. The on-demand data storage service 914 may be a collection of computing resources configured to synchronously process requests to store and/or access data. The on-demand data storage service 914 may operate using computing resources (e.g., databases) that enable the on-demand data storage service 914 to locate and retrieve data quickly, so as to allow data to be provided in responses to requests for the data. For example, the on-demand data storage service 914 may maintain stored data in a manner such that, when a request for a data object is retrieved, the data object can be provided (or streaming of the data object can be initiated) in a response to the request. As noted, data stored in the on-demand data storage service 914 may be organized into data objects. The data objects may have arbitrary sizes except, perhaps, for certain constraints on size. Thus, the on-demand data storage service 914 may store numerous data objects of varying sizes. The on-demand data storage service 914 may operate as a key value store that associates data objects with identifiers of the data objects that may be used by the customer 904 to retrieve or perform other operations in connection with the data objects stored by the on-demand data storage service 914.

In the environment illustrated in FIG. 9, a notification service 916 is included. The notification service 916 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 916 may provide notifications to clients using a "push" mechanism without the need to check periodically check or "poll" for new information and updates. The notification service 916 may further be used for various purposes such as monitoring applications executing in the virtual computer system service 908, workflow systems, time-sensitive information updates, mobile applications, and many others.

As illustrated in FIG. 9, the computing resource service provider 902, in various examples, includes an authentication system 918 and a policy management service 920. The authentication system 918, in an example, is a computer system (i.e., collection of computing resources) configured to perform operations involved in authentication of users of the customer. For instance, one of the services 908-916 and 920-926 may provide information from a user to the authentication service system 918 to receive information in return that indicates whether or not whether the user requests are authentic.

The policy management service 920, in an example, is a computer system configured to manage policies on behalf of customers (such as customer 904) of the computing resource service provider 902. The policy management service 920 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 902, in various examples, is also equipped with a task service 922. The task service 922 is configured to receive a task package from the customer 904 and enable executing tasks as dictated by the task package. The task service 922 may be configured to use any resource of the computing resource service provider 902, such as one or more instantiated virtual machines or virtual hosts, for executing the task. The task service 922 may configure the one or more instantiated virtual machines or virtual hosts to operate using a selected operating system and/or a selected execution application in accordance with a requirement of the customer 904.

The computing resource service provider 902 additionally maintains one or more other services 924 based at least in part on the needs of its customers 904. For instance, the computing resource service provider 902 may maintain a database service for its customers 904. A database service may be a collection of computing resources that collectively operate to run one or more databases for one or more customers 904. The customer 904 may operate and manage a database from the database service by utilizing appropriately configured API calls. This, in turn, may allow a customer 904 to maintain and potentially scale the operations in the database. Other services include, but are not limited to, object-level archival data storage services, services that manage and/or monitor other services.

The programmatic instruction service programmatic instruction generation service 926 may include those services described above or some or all may be separately part of the service provider system 902. For example, in some examples, the programmatic instruction generation service 926 can comprise a graphical management service, a call logging service and/or a program generator as discussed above.

Figure 10:
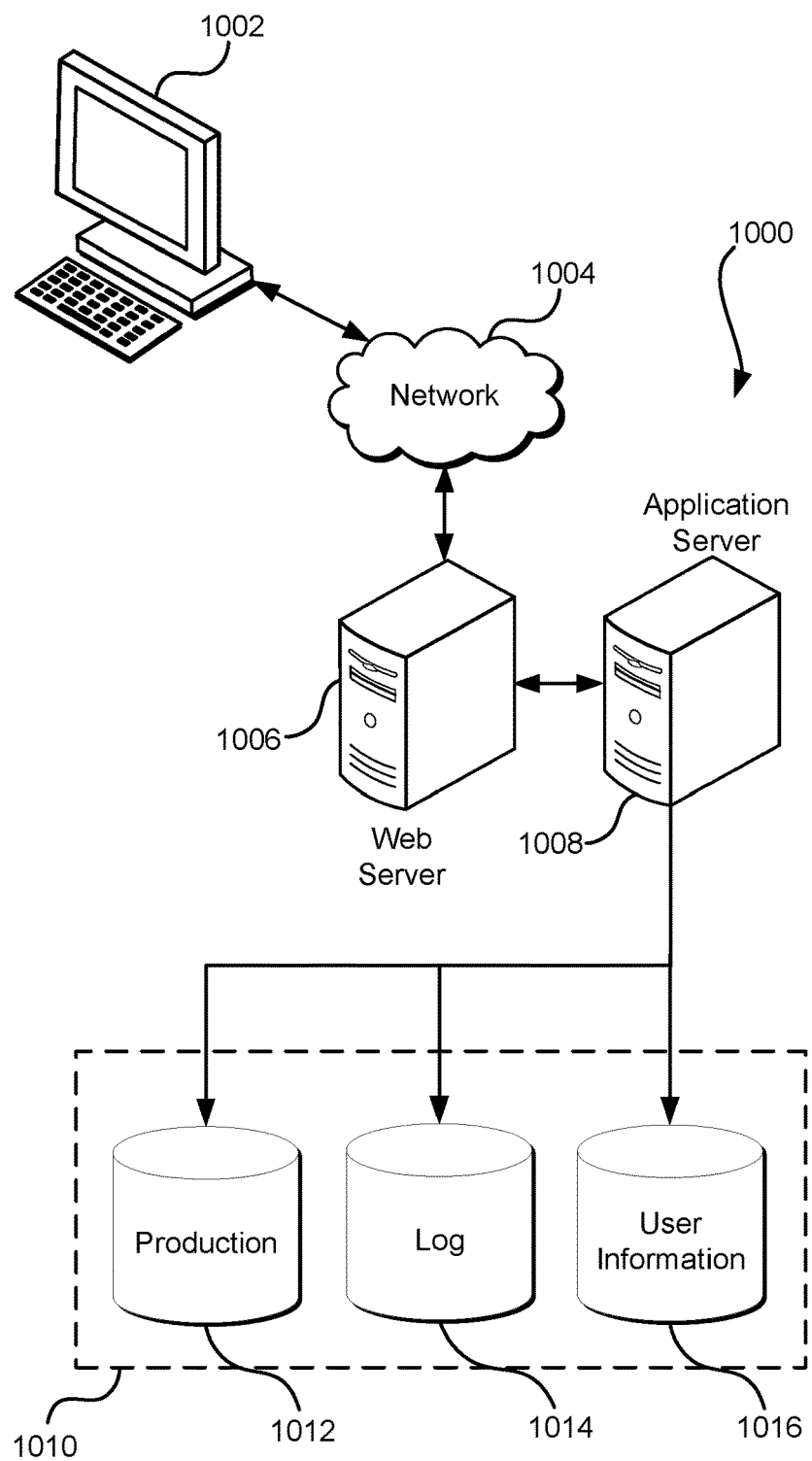
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to render immutable a functionality associated with a virtual machine instance, the functionality including a network configuration of the virtual machine instance, the network configuration being at least partially outside of control of a requestor associated with the request;
   processing the request by at least causing the configuration of the management component to reject incoming authorized change requests associated with the management component and the virtual machine instance; and in response to an authorized change request received by an instance manager associated with a physical host executing the virtual machine instance, at least:
propagating, by the instance manager, the authorized change request to the management component; and
in response to receiving notification of a rejection of the authorized change request from the management component, synchronizing a first state associated with the management component with a corresponding second state associated with the instance manager and the virtual machine instance, the second state reflecting rejection of the authorized change request.

2. The computer-implemented method of claim 1, wherein the request is further processed by at least providing information regarding immutability of the functionality to the instance manager.

3. The computer-implemented method of claim 1, wherein the authorized change request is associated with changes made to the virtual machine instance while the instance is executing.

4. The computer-implemented method of claim 1, further comprising reflecting immutability status associated with the functionality and the virtual machine instance on an interface made available to at least the requestor.

5. A system, comprising:
at least one physical computing device that implements one or more services that at least:
instantiate an instance such that a configuration of a functionality of the instance is immutable;
propagate information associated with immutability of the configuration to at least an instance manager associated with physical hardware executing the instance;
implement one or more management components to execute on the instance; and
reject, by the instance manager, updates to the configuration in conflict with a state of the configuration at a time at which the instance was instantiated.

6. The system of claim 5, wherein at least one other management component is implemented separately from the physical hardware executing the instance.

7. The system of claim 6, wherein the at least one other management component instantiates the instance.

8. The system of claim 5, wherein the updates to the configuration are a result of an attempted update to the instance.

9. The system of claim 5, wherein the updates to the configuration are a result of a change initiated by a component that instantiated the instance.

10. The system of claim 5, wherein the instance manager is a virtualization layer implemented on the physical hardware.

11. The system of claim 5, wherein the physical hardware includes one or more physical hosts.

12. The system of claim 5, wherein the functionality includes at least network functionality.

13. A non-transitory computer-readable storage medium having stored thereon executable instructions that, as a result of being executed by one or more processors of a computer system, cause the computer system to at least:
in response to a request to render immutable a functionality associated with an instance, lock changes to the functionality associated with an instance, the functionality involving an attribute outside of control of a requestor associated with the request, the attribute associated with configuration of a management component capable of manipulating behavior of the virtual machine instance, by at least:
propagating information regarding the functionality to be locked to at least one management component associated with the instance; and
in response to a proposed change to the functionality, at least rejecting the proposed change by the at least one management component.

14. The non-transitory computer-readable storage medium of claim 13, wherein the instructions further comprise instructions that, as a result of being executed by the one or more processors, cause the computer system to synchronize a state of the at least one management component, including the rejected proposed change, with a different component associated with implementation of the instance.

15. The non-transitory computer-readable storage medium of claim 14, wherein the different component is an instance manager executing on physical hardware associated with the instance.

16. The non-transitory computer-readable storage medium of claim 13, wherein the instructions that cause the computer system to lock the changes to the functionality further include instructions that cause the computer system to instantiate the instance.

17. The non-transitory computer-readable storage medium of claim 13, wherein the management component is a service of an implementing computing resource service provider.

18. The non-transitory computer-readable storage medium of claim 13, wherein the functionality is partly, but not completely, under control of an operator of the instance.

19. The non-transitory computer-readable storage medium of claim 13, wherein the functionality includes routing functionality between the instance and one or more other instances.

20. The non-transitory computer-readable storage medium of claim 13, wherein the attribute is related to at least one of networking, data storage, virtualization information, or authorized user for the instance.

* * * * *